(12) United States Patent
Zeng et al.

(10) Patent No.: US 8,687,797 B2
(45) Date of Patent: Apr. 1, 2014

(54) METHOD AND SYSTEM FOR A DUAL ECHO CANCELLER

(75) Inventors: Hanks Zeng, Red Bank, NJ (US);
Prakash Khanduri, Freehold, NJ (US);
Ken Kasiske, Jackson, NJ (US); Ronish Patel, Manalapan, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 609 days.

(21) Appl. No.: 12/474,065

(22) Filed: May 28, 2009

(65) Prior Publication Data

US 2010/0303228 A1    Dec. 2, 2010

(51) Int. Cl.
*H04M 9/08* (2006.01)

(52) U.S. Cl.
USPC ..................................... 379/406.08

(58) Field of Classification Search
USPC ..................................... 379/406.08
See application file for complete search history.

(56) References Cited

U.S. PATENT DOCUMENTS

| | | | | |
|---|---|---|---|---|
| 5,305,309 | A * | 4/1994 | Chujo et al. | 370/290 |
| 5,631,900 | A * | 5/1997 | McCaslin et al. | 370/287 |
| 6,028,929 | A * | 2/2000 | Laberteaux | 379/406.08 |
| 6,078,567 | A * | 6/2000 | Traill et al. | 370/289 |
| 6,507,653 | B1 * | 1/2003 | Romesburg | 379/406.05 |

OTHER PUBLICATIONS

Jelena Nikolic, Implementing a Line-Echo Canceller Using the Block Update and NLMS Algorithms on the TMS320C54x DSP, Application Report: SPRA188, Texas Instruments (Apr. 1997).*

* cited by examiner

*Primary Examiner* — Alexander Jamal
(74) *Attorney, Agent, or Firm* — Sterne, Kessler, Goldstein & Fox P.L.L.C.

(57) ABSTRACT

Methods and systems for a dual echo canceller (EC) are disclosed and may include cancelling echo in utilizing a dual echo canceller, wherein said dual echo canceller includes an active echo canceller and an adaptive echo canceller. Filter coefficients may be copied from the adaptive echo canceller to the active echo canceller for the cancellation, based on whether said adaptive echo canceller has converged. The coefficients may be copied utilizing copy logic, which may comprise divergence detection and/or echo path change detection. The coefficients may be reset to default settings utilizing the copy logic. The coefficients may be calculated utilizing normalized block least mean squares (NBLMS), and may be calculated when the NBLMS is enabled by update logic. The coefficients may be calculated utilizing linear predictive coefficient (LPC) filtered uplink and downlink signals.

26 Claims, 5 Drawing Sheets

METHOD AND SYSTEM FOR A DUAL ECHO CANCELLER

CROSS-REFERENCE TO RELATED APPLICATIONS/INCORPORATION BY REFERENCE

This application makes reference to:
U.S. patent application Ser. No. 12/367,854 filed on Feb. 9, 2009; and
U.S. patent application Ser. No. 12/474,061 filed on May 28, 2009.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of audio signals. More specifically, certain embodiments of the invention relate to a method and system for a dual echo canceller.

BACKGROUND OF THE INVENTION

In audio applications, systems that provide audio interface and processing capabilities may be required to support duplex operations, which may comprise the ability to collect audio information through a sensor, microphone, or other type of input device while at the same time being able to drive a speaker, earpiece of other type of output device with processed audio signal. In order to carry out these operations, these systems may utilize audio coding and decoding (codec) devices that provide appropriate gain, filtering, and/or analog-to-digital conversion in the uplink direction to circuitry and/or software that provides audio processing and may also provide appropriate gain, filtering, and/or digital-to-analog conversion in the downlink direction to the output devices.

As audio applications expand, such as new voice and/or audio compression techniques and formats, for example, and as they become embedded into wireless systems, such as mobile phones, for example, novel codec devices may be needed that may provide appropriate processing capabilities to handle the wide range of audio signals and audio signal sources. In this regard, added functionalities and/or capabilities may also be needed to provide users with the flexibilities that new communication and multimedia technologies provide. Moreover, these added functionalities and/or capabilities may need to be implemented in an efficient and flexible manner given the complexity in operational requirements, communication technologies, and the wide range of audio signal sources that may be supported by mobile phones.

The audio inputs to mobile phones may come from a variety of sources, at a number of different sampling rates, and audio quality. Polyphonic ringers, voice, and high quality audio, such as music, are sources that are typically processed in a mobile phone system. The different quality of the audio source places different requirements on the processing circuitry, thus dictating flexibility in the audio processing systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a dual echo canceller, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a dual echo canceller. Exemplary aspects of the invention may comprise cancelling echo signals utilizing a dual echo canceller, wherein the dual echo canceller comprises an active echo canceller and an adaptive echo canceller. Filter coefficients may be copied from the adaptive echo canceller to the active echo canceller for the cancellation, based on whether the adaptive echo canceller has converged. The filter coefficients for the adaptive echo canceller may be copied utilizing copy logic, which may comprise divergence detection logic and/or echo path change detection logic. The filter coefficients for the adaptive echo canceller may be reset to default settings utilizing the copy logic. The filter coefficients for the adaptive echo canceller may be calculated utilizing normalized block least mean squares (NBLMS). In one embodiment of the invention, the filter coefficients for the adaptive echo canceller may be calculated when the NBLMS is enabled by update logic. The adaptive echo canceller filter coefficients may be calculated utilizing linear predictive coefficient (LPC) filtered uplink and downlink signals. The signals may comprise audio signals.

Figure 1:
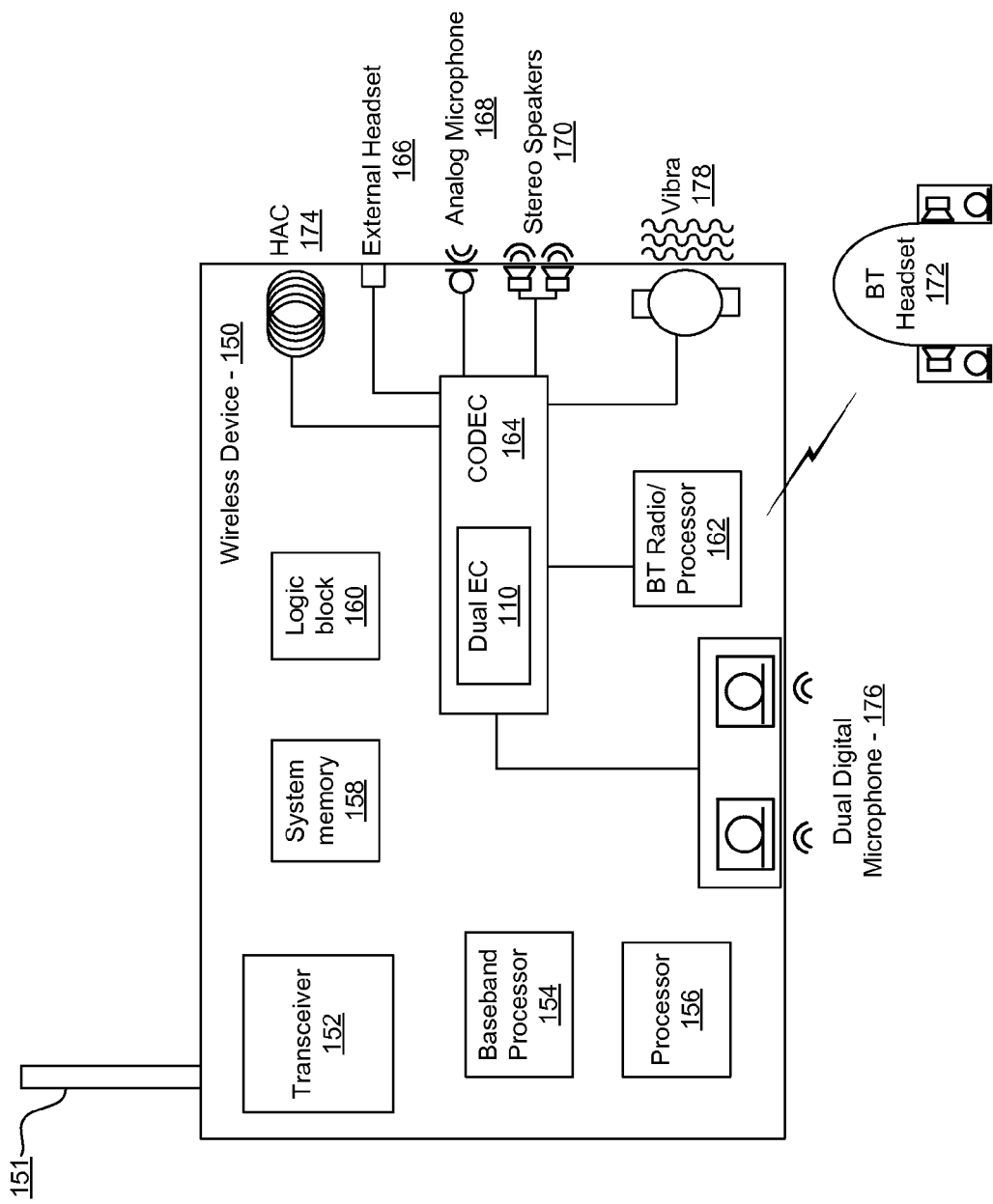
FIG. 1 is a module diagram of an exemplary wireless system, which may be utilized in accordance with an embodiment of the invention.

FIG. 1 is a module diagram of an exemplary wireless system, which may be utilized in accordance with an embodiment of the invention. Referring to FIG. 1, the wireless device 150 may comprise an antenna 151, a transceiver 152, a baseband processor 154, a processor 156, a system memory 158, a logic module 160, a Bluetooth radio/processor 162, a CODEC 164, an external headset port 166, an analog microphone 168, stereo speakers 170, a Bluetooth headset 172, a hearing aid compatible (HAC) coil 174, a dual digital microphone 176, and a vibration transducer 178. The antenna 151 may be used for reception and/or transmission of RF signals.

The transceiver 152 may comprise suitable logic, circuitry, interfaces, and/or code that may be enabled to modulate and upconvert baseband signals to RF signals for transmission by one or more antennas, which may be represented generically by the antenna 151. The transceiver 152 may also be enabled to downconvert and demodulate received RF signals to baseband signals. The RF signals may be received by one or more antennas, which may be represented generically by the antenna 151. Different wireless systems may use different antennas for transmission and reception. The transceiver 152 may be enabled to execute other functions, for example, filtering the baseband and/or RF signals, and/or amplifying the baseband and/or RF signals. Although a single transceiver 152 is shown, the invention is not so limited. Accordingly, the transceiver 152 may be implemented as a separate transmitter and a separate receiver. In addition, there may be a plurality transceivers, transmitters and/or receivers. In this regard, the plurality of transceivers, transmitters and/or receivers may enable the wireless device 150 to handle a plurality of wireless protocols and/or standards including cellular, WLAN and PAN.

The baseband processor 154 may comprise suitable logic, circuitry, interfaces, and/or code that may be enabled to process baseband signals for transmission via the transceiver 152 and/or the baseband signals received from the transceiver 152. The processor 156 may be any suitable processor or controller such as a CPU, DSP, ARM, or any type of integrated circuit processor. The processor 156 may comprise suitable logic, circuitry, and/or code that may be enabled to control the operations of the transceiver 152 and/or the baseband processor 154. For example, the processor 156 may be utilized to update and/or modify programmable parameters and/or values in a plurality of components, devices, and/or processing elements in the transceiver 152 and/or the baseband processor 154. At least a portion of the programmable parameters may be stored in the system memory 158.

Control and/or data information, which may comprise the programmable parameters, may be transferred from other portions of the wireless device 150, not shown in FIG. 1, to the processor 156. Similarly, the processor 156 may be enabled to transfer control and/or data information, which may include the programmable parameters, to other portions of the wireless device 150, not shown in FIG. 1, which may be part of the wireless device 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The system memory 158 may comprise suitable logic, circuitry, and/or code that may be enabled to store a plurality of control and/or data information, including parameters needed to calculate frequencies and/or gain, and/or the frequency value and/or gain value. The system memory 158 may store at least a portion of the programmable parameters that may be manipulated by the processor 156.

The logic module 160 may comprise suitable logic, circuitry, and/or code that may enable controlling of various functionalities of the wireless device 150. For example, the logic module 160 may comprise one or more state machines that may generate signals to control the transceiver 152 and/or the baseband processor 154. The logic module 160 may also comprise registers that may hold data for controlling, for example, the transceiver 152 and/or the baseband processor 154. The logic module 160 may also generate and/or store status information that may be read by, for example, the processor 156. Amplifier gains and/or filtering characteristics, for example, may be controlled by the logic module 160.

The BT radio/processor 162 may comprise suitable circuitry, logic, and/or code that may enable transmission and reception of Bluetooth signals. The BT radio/processor 162 may enable processing and/or handling of BT baseband signals. In this regard, the BT radio/processor 162 may process or handle BT signals received and/or BT signals transmitted via a wireless communication medium. The BT radio/processor 162 may also provide control and/or feedback information to/from the baseband processor 154 and/or the processor 156, based on information from the processed BT signals. The BT radio/processor 162 may communicate information and/or data from the processed BT signals to the processor 156 and/or to the system memory 158. Moreover, BT radio/processor 162 may receive information from the processor 156 and/or the system memory 158, which may be processed and transmitted via the wireless communication medium.

The CODEC 164 may comprise suitable circuitry, logic, interfaces, and/or code that may process audio signals received from and/or communicated to input/output devices. The input devices may be within or communicatively coupled to the wireless device 150, and may comprise the analog microphone 168, the stereo speakers 170, the Bluetooth headset 172, the hearing aid compatible (HAC) coil 174, the dual digital microphone 176, and the vibration transducer 178, for example. The CODEC 164 may be operable to up-convert and/or down-convert signal frequencies to desired frequencies for processing and/or transmission via an output device. The CODEC 164 may enable utilizing a plurality of digital audio inputs, such as 16 or 18-bit inputs, for example. The CODEC 164 may also enable utilizing a plurality of data sampling rate inputs. For example, the CODEC 164 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The CODEC 164 may also support mixing of a plurality of audio sources. For example, the CODEC 164 may support audio sources such as general audio, polyphonic ringer, I2S FM audio, vibration driving signals, and voice. In this regard, the general audio and polyphonic ringer sources may support the plurality of sampling rates that the audio CODEC 164 is enabled to accept, while the voice source may support a portion of the plurality of sampling rates, such as 8 kHz and 16 kHz, for example.

The audio CODEC 164 may utilize a programmable infinite impulse response (IIR) filter and/or a programmable finite impulse response (FIR) filter for at least a portion of the audio sources to compensate for passband amplitude and phase fluctuation for different output devices. In this regard, filter coefficients may be configured or programmed dynamically based on current operations. Moreover, filter coefficients may be switched in one-shot or may be switched sequentially, for example. The CODEC 164 may also utilize a modulator, such as a Delta-Sigma (Δ-Σ) modulator, for example, to code digital output signals for analog processing.

The external headset port 166 may comprise a physical connection for an external headset to be communicatively coupled to the wireless device 150. The analog microphone 168 may comprise suitable circuitry, logic, and/or code that may detect sound waves and convert them to electrical signals via a piezoelectric effect, for example. The electrical signals generated by the analog microphone 168 may comprise analog signals that may require analog to digital conversion before processing.

The stereo speakers 170 may comprise a pair of speakers that may be operable to generate audio signals from electrical signals received from the CODEC 164. The Bluetooth headset 172 may comprise a wireless headset that may be communicatively coupled to the wireless device 150 via the Bluetooth radio/processor 162. In this manner, the wireless device 150 may be operated in a hands-free mode, for example.

The HAC coil 174 may comprise suitable circuitry, logic, interfaces, and/or code that may enable communication between the wireless device 150 and a T-coil in a hearing aid, for example. In this manner, electrical audio signals may be communicated to a user that utilizes a hearing aid, without the need for generating sound signals via a speaker, such as the stereo speakers 170, and converting the generated sound signals back to electrical signals in a hearing aid, and subsequently back into amplified sound signals in the user's ear, for example.

The dual digital microphone 176 may comprise suitable circuitry, interfaces, logic, and/or code that may be operable to detect sound waves and convert them to electrical signals. The electrical signals generated by the dual digital microphone 176 may comprise digital signals, and thus may not require analog to digital conversion prior to digital processing in the CODEC 164. The dual digital microphone 176 may enable beamforming capabilities, for example.

The vibration transducer 178 may comprise suitable circuitry, logic, interfaces, and/or code that may enable notification of an incoming call, alerts and/or message to the wireless device 150 without the use of sound. The vibration transducer may generate vibrations that may be in synch with, for example, audio signals such as speech or music.

In operation, control and/or data information, which may comprise the programmable parameters, may be transferred from other portions of the wireless device 150, not shown in FIG. 1, to the processor 156. Similarly, the processor 156 may be enabled to transfer control and/or data information, which may include the programmable parameters, to other portions of the wireless device 150, not shown in FIG. 1, which may be part of the wireless device 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The CODEC 164 in the wireless device 150 may communicate with the processor 156 in order to transfer audio data and control signals. Control registers for the CODEC 164 may reside within the processor 156. The processor 156 may exchange audio signals and control information via the system memory 158. The CODEC 164 may up-convert and/or down-convert the frequencies of multiple audio sources for processing at a desired sampling rate.

The wireless device 150 may comprise a dual echo canceller 110 the latter of which may comprise an adaptive echo canceller and an active echo canceller. The adaptive echo canceller and the active echo canceller are described further with respect to FIGS. 3 and 4. In addition, the dual echo canceller 110 may comprise copy logic that may be enabled to determine divergence or convergence of the adaptive echo canceller and may then transfer the filter characteristics into the active echo canceller upon convergence. In this manner, when an echo path changes, such as when the wireless device moves from outside to inside an automobile, for example, the echo cancellation may adapt and cancel unwanted echoes. Similarly, the copy logic may be operable to reset the active echo canceller to default filter characteristics when it detects divergence above a threshold value. Cancellation of the echo utilizing a dual echo canceller 110 in the CODEC 164 provides enhanced audio performance and user experience for users of the wireless device 150.

Figure 2:
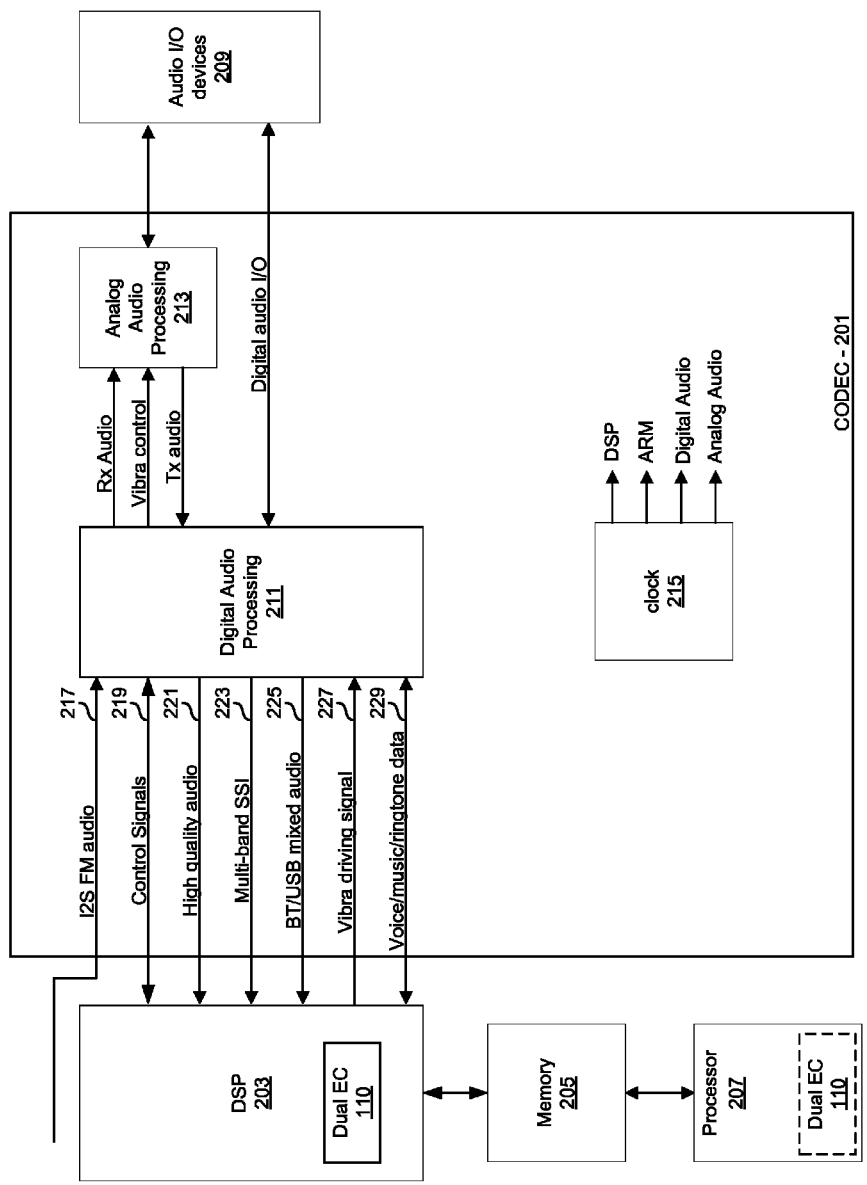
FIG. 2 is a module diagram illustrating an exemplary audio CODEC interconnection, in accordance with an embodiment of the invention.

FIG. 2 is a module diagram illustrating an exemplary audio CODEC interconnection, in accordance with an embodiment of the invention. Referring to FIG. 2, there is shown a CODEC 201, a digital signal processor (DSP) 203, a memory 205, a processor 207, and an audio I/O devices module 209. There is also shown input and output signals for the digital audio processing module 211 comprising an $I^2S$ FM audio signal, control signals 219, voice/audio signal 221, a multi-band SSI signal 223, a mixed audio signal 225, a vibration driving signal 227, and a voice/music/ringtone data signal 229. The memory 205 may be substantially to the system memory 158. In another embodiment of the invention, the memory 205 may comprise a separate memory from the system memory 158.

The CODEC 201 may be substantially similar to the CODEC 164 described with respect to FIG. 1, and may comprise a digital audio processing module 211, an analog audio processing module 213, and a clock 215. The digital audio processing module 211 may comprise suitable circuitry, logic, interfaces, and/or code that may be operable to process received digital audio signals for subsequent storage and/or communication to an output device. The digital audio processing module 211 may comprise digital filters, such as decimation and infinite impulse response (IIR) filters, for example. The analog audio processing module 213 may comprise suitable circuitry, logic, interfaces, and/or code that may be operable to process received analog signals for communication to the audio I/O devices module 209 and/or the digital audio processing module 211. The analog audio processing module 213 may enable conversion of analog signals to digital signals and may filter received signals before processing, for example. In addition, the analog audio processing module 213 may provide amplification of received audio signals.

The clock 215 may comprise suitable circuitry, logic, interfaces, and/or code that may generate a common clock signal that may be utilized by the DSP 203, the processor 207, the digital audio processing module 211, and the analog audio processing module 213. In this manner, the synchronization of multiple audio signals during processing, transmission, and/or playback may be enabled.

The DSP 203 may comprise suitable circuitry, logic, interfaces, and/or code that may process signals received from the digital audio processing module 211 and/or retrieved from the memory 205. The DSP 203 may also store processed data in the memory 205 or communicate processed data to the digital audio processing module 211. In an embodiment of the invention, the DSP 203 may be integrated on-chip with the CODEC 201. The dual EC 110 may be as described with respect to FIG. 1, and may be implemented in the DSP 203 and/or the processor 207.

The processor 207 may comprise suitable circuitry, logic, interfaces, and/or code that may be operable to perform routine processor functions with, for example, minimal power requirements. In one embodiment of the invention, the processor 207 may comprise an advanced RISC machine processor. Notwithstanding, the invention is not so limited, and other types of processor may be utilized. The processor 207 may be communicatively coupled with the memory 205, and may be operable to store data on and/or retrieve data from the memory 205. The processor 207 may also be operable to communicate data and/or control information between the DSP 203 and/or memory 205 to enable for more signal processing tasks by the DSP 203. For example, the processor 207 may communicate with the DSP to enable signal processing of audio signals.

In operation, the CODEC 201 may communicate with the DSP 203 in order to transfer audio data and control signals, with the exception of FM radio listening and recording, where digital FM samples may be read from an I2S directly off a Bluetooth FM receiver, such as the Bluetooth radio/processor described, with respect to FIG. 1. Control registers for the CODEC 201 may, for example, reside in the DSP 203. For voice data, audio samples may not be buffered between the DSP 203 and the CODEC 201. For music and ring-tone, audio data from the DSP 203 may be written into a FIFO, for example, within the CODEC 201 which may then fetch the data samples. A similar method may be utilized for the high quality audio 221, which may sample at 48 KHz, for example. Audio data passing between the DSP 203 and the CODEC 201 may be accomplished via interrupts. These interrupts may comprise interrupts for voice/music/ring-tone data 229, the mixed audio signal 225 at 44.1 KHz/48 KHz for Bluetooth/USB, high quality audio 221 at 48 KHz, and for the vibration driving signal 227. Interrupts may be shared between different inputs and outputs.

The audio sample data for the voice/music/ringtone data 229 in the audio receive path and the high quality audio 221 in the audio transmit path may comprise 18-bit width per sample, for example. In instances where 16-bit audio data may be present, the same 18-bit format may be used, with the two least significant bits (LSBs) zeroed, for example.

In an embodiment of the invention, the DSP 203 and the processor 207 may exchange audio data and control information via a shared memory, for example, memory 205. The processor 207 may write pulse-code modulated (PCM) audio directly into the memory 205, and may also pass coded audio data to the DSP 203 for computationally intensive processing. In this instance, the DSP 203 may decode the data and write the PCM audio back into the memory 205 for the processor 207 to access or to be delivered to the CODEC 201. The processor 207 may communicate with the CODEC 201 via the DSP 203.

In an exemplary embodiment of the invention, the CODEC 201 may be operable to estimate and cancel echo in audio signals. The wireless device 150 may comprise a dual echo canceller 110 that may comprise an adaptive echo canceller and an active echo canceller. The adaptive echo canceller may be operable to determine divergence or convergence of an echo cancellation signal and may copy filter characteristics into the active echo canceller when it converges. In this manner, when an echo path changes, such as when the wireless device moves from outside to inside an automobile, for example, the echo cancellation may adapt and cancel unwanted echoes. Cancellation of the echo utilizing the dual echo canceller 110 in the CODEC 201 provides enhanced audio performance and user experience for users of the wireless device 150.

Although downlink (DL) and uplink (UL) signals may overlap in the time domain during double talk, where both wireless device users in a conversation are speaking at the same time, it is not as likely that the signals overlap completely in the frequency domain. The CODEC 201 may be operable to utilize normalized block least mean squares (NBLMS) for updating the adaptive filtering, and linear prediction coefficient (LPC) filtering to generate appropriate signals for analysis.

Figure 3:
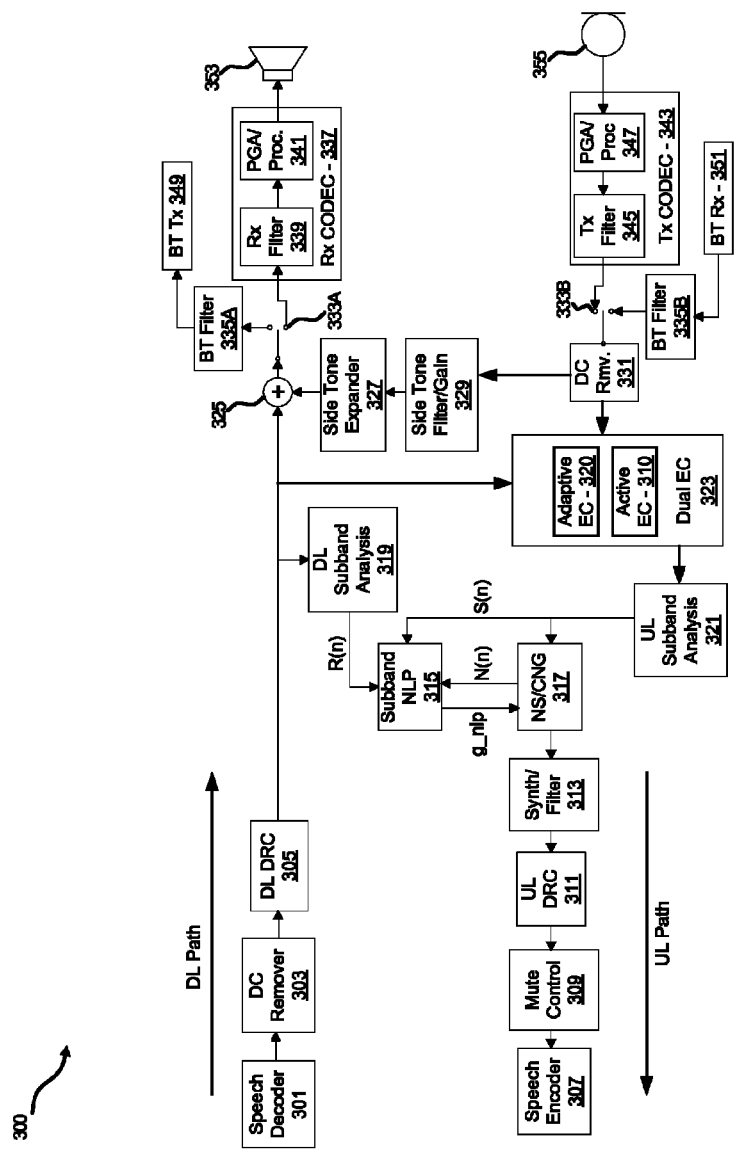
FIG. 3 is a diagram of an exemplary audio system, in accordance with an embodiment of the invention.

FIG. 3 is a diagram of an exemplary audio system architecture in accordance with an embodiment of the invention. Referring to FIG. 3, there is shown an audio system architecture 300 comprising a speech decoder 301, DC remover module 303, a downlink dynamic range controller (DL DRC) 305, a speech encoder 307, a mute control 309, an uplink dynamic range controller (UL DRC) 311, and a synthesis/filter module 313. FIG. 3 also shows a subband non-linear processor (NLP) 315, a noise suppressor/comfort noise generator (NS/CNG) 317, a DL subband analysis module 319, an UL subband analysis module 321, a dual echo canceller (EC) 323, a summer 325, a side tone expander 327, a side tone filter/gain module 329, a DC remover 331, and switches 333A and 333B. Additionally, FIG. 3 shows Bluetooth (BT) filters 335A and 335B, an Rx CODEC 337, a Tx filter 339, a Tx PGA/processing module 341, a Tx CODEC 343, an Rx filter 345, a Tx PGA/processing module 347, a BT Tx 349, a BT Rx 351, a speaker 353, and a microphone 355. There is also shown a noise level signal N(n), a DL level signal R(n), and a UL signal S(n). The dual EC 323 may comprise an active EC 310 and an adaptive EC 320.

The speech decoder 301 may comprise suitable circuitry, logic, interfaces, and/or code that may be operable to decode a received speech signal and generate an output signal that may be further processed and played back by an output device, such as the speaker 353, for example.

The DC remover 303 may comprise suitable circuitry, logic, interfaces, and/or code that may be operable to remove the DC portion of a received signal from the speech decoder 301. The DL DRC 305 may comprise suitable circuitry, interfaces, logic, and/or code that may be operable to control the dynamic range of a received audio signal. In this manner, distortion may be reduced at high volume situations, such as when a cell phone user may utilize a speaker phone mode with a high volume setting, for example.

The speech encoder 307 may comprise suitable circuitry, logic, interfaces, and/or code that may be operable to encode a received speech signal for subsequent processing and transmission, for example. The received signal may be generated by an input device, such as the microphone 355, for example.

The mute control module 309 may comprise suitable circuitry, logic, interfaces, and/or code that may be operable to mute a received audio signal. In this manner, a wireless device such as a mobile phone, may playback a received audio signal via a speaker, but not transmit another received signal, such as from a microphone.

The UL DRC 311 may comprise suitable circuitry, logic, interfaces, and/or code that may be operable to control the dynamic range of a received audio signal. In this manner, distortion may be reduced at high volume situations, such as when a cell phone user may utilize a speakerphone mode with a high volume setting, or be in a high noise environment, for example.

The synthesizer/filter module 313 may comprise suitable circuitry, logic, interfaces, and/or code that may be operable to generate noise cancellation signals and filter unwanted signals. The filtering capability in the synthesizer/filter module 313 may comprise a high pass filter, for example.

The subband NLP 315 may comprise suitable circuitry, logic, interfaces, and/or code that may be operable to suppress residual echo. The subband NLP may receive as inputs, the noise level signal N(n), and the UL and DL signals S(n) and R(n), generated by the DL subband analysis module 319 and the UL subband analysis module 321. The subband NLP output may be communicatively coupled to the NS/CNG module 317.

The NS/CNG module 317 may comprise suitable circuitry, logic, interfaces, and/or code that may be operable to suppress noise and/or generate a comfort noise signal, which may indicate to a mobile device user that the person on the other end of the call is still present, as opposed to complete silence.

The DL subband analysis module 319 may comprise suitable circuitry, logic, interfaces, and/or code that may be operable to suppress residual echo. The input of the DL subband analysis module 319 may be communicatively coupled to the output of the DL DRC module 305, and may analyze the non-linear characteristics of the received signal, which may be received by the wireless device 150, described with respect to FIG. 1.

The UL subband analysis module 321 may comprise suitable circuitry, logic, interfaces, and/or code that may be operable to suppress residual echo in an upload signal, such as one generated by the microphone 355. The input of the UL subband analysis module 321 may be communicatively coupled to the output of the dual EC 323. The output of the UL subband analysis module 321 may be communicatively coupled to the NS/CNG module 317 and the subband NLP module 315.

The dual EC 323 may comprise suitable circuitry, logic, interfaces, and/or code that may be operable to cancel echoes in audio signals. The inputs of the dual EC 323 may be communicatively coupled to the DC remover 331 and the output of the DL DRC 305. The output of the dual EC 323 may be communicatively coupled to the UL subband analysis module 321.

The summer 325 may comprise suitable circuitry, logic, interfaces, and/or code that may be operable to receive a plurality of input signals and generate an output signal that may be the sum of the input signals. The inputs of the summer 325 may be communicatively coupled to the DL DRC module 305 and the side tone expander module 327. The output of the summer 325 may be communicatively coupled to the switch 333A.

The side tone expander module 327 may comprise suitable circuitry, logic, interfaces, and/or code that may be operable to amplify audio signals in a desired frequency range and attenuate signals in another frequency band. In this manner, the amplitude of desired signals may be selectively amplified while decreasing the magnitude of other signals.

The side tone filter/gain module 329 may comprise suitable circuitry, logic, interfaces, and/or code that may be operable to shape the side tone frequency that may be generated by the UL signal at the output of the DC remover 331. The output of the side tone filter/gain module 329 may be communicatively coupled to the side tone expander module 327.

The DC remover 331 may be substantially similar to the DC remover 303, but may be operable to remove DC signals from a Tx signal generated by the microphone 355 and/or the BT Rx 351, for example.

The switch 333A may comprise suitable circuitry, logic, interfaces, and/or code that may be operable to switch between a DL signal generated by the summer 325 for communication to the Rx CODEC 337 or the BT filter 335A. Similarly, the switch 333B may comprise suitable circuitry, logic, and/or code that may be operable to switch between the Tx CODEC 343 and the BT filter 335B, and communicate the desired signal to the DC remover 331.

The BT filters 335A and 335B may comprise suitable circuitry, logic, interfaces, and/or code that may be operable to filter out undesired signals and allow desired BT signals to pass. The BT filter 335A may be communicatively coupled to the summer 325, in instances where the switch 333A is switched to the BT filter 335A. The output of the BT filter 335A may be communicatively coupled to the BT Tx 349. The input of the BT filter 335B may be communicatively coupled to the BT Rx 351, and the output may be communicatively coupled to the switch 333B.

The Rx CODEC 337 may comprise suitable circuitry, logic, interfaces, and/or code that may be operable to process received audio signals for communication to an output device, such as the speaker 353. The Rx CODEC 337 may comprise the Rx filter 339 and the PGA/processing module 341. The Rx filter 339 may comprise suitable circuitry, interfaces, logic, and/or code that may be operable to filter out undesired signals while allowing a desired audio signal to be communicated to the PGA/processing module 341. The Rx filter 339 may comprise digital infinite impulse response (IIR) filters, such as biquads, for example. The PGA/processing module 341 may comprise suitable circuitry, logic, and/or code that may be operable to amplify a received audio signal as well as perform other audio processing tasks for enhancing the desired audio signal quality.

The Tx CODEC 343 may comprise suitable circuitry, logic, interfaces, and/or code that may be operable to process received audio signals received from an input device, such as the microphone 355. The Tx CODEC 343 may comprise the Tx filter 345 may comprise suitable circuitry, logic, interfaces, and/or code that may be operable to filter undesired signals while allowing desired signals received from the PGA/processing module 347 to pass. The Tx filter 345 may comprise digital infinite impulse response (IIR) filters, such as biquads, for example. In an embodiment of the invention, the Rx CODEC 337 and the Tx CODEC 343 may be integrated in a hardware block, such as the digital audio processing module 211, described with respect to FIG. 2.

The PGA/processing module 347 may comprise suitable circuitry, logic, interfaces, and/or code that may be operable to amplify a signal received from the microphone 355 as well as to perform other audio processing tasks for the desired audio signal quality.

The BT Tx 349 may comprise suitable circuitry, logic, interfaces, and/or code that may be operable to wirelessly transmit a BT signal to a BT device, such as a BT headset, for example. The input of the BT Tx 349 may be communicatively coupled to the output of the BT filter 335A. The BT Rx 351 may comprise suitable circuitry, logic, and/or code that may be operable to receive a BT signal from a BT device, such as a BT headset, for example.

The speaker 353 may comprise suitable circuitry, logic, interfaces, and/or code that may be operable to generate and output an audio signal from an electrical signal received from the Rx CODEC 337. The microphone 355 may comprise suitable circuitry, logic, and/or code that may be operable to generate an electrical signal from a received audio signal, and communicate the generated electrical signal to the Tx CODEC 343 for processing, for example.

In operation, in the DL path, a speech signal from the speech decoder 301 may pass through the DC remover 303 followed by the DL DRC 305. The DL DRC 305 may perform pre-emphasis, gain control, expansion and compression to increase subjective loudness, to reduce background noise and to prevent speaker overload. The output of the DL DRC 305 may be communicated to the Rx CODEC 337 via the switch 333A. The RX CODEC 337 may comprise digital IIR filter to compensate for the response of the speaker 353. The Rx CODEC 337 may also comprise digital & analog gain stages, delta-to-sigma DAC, power amplifier, and analog filters, for example.

For the UL path, the Tx CODEC 343 may also comprise digital IIR filters, such as biquads, for example, to compensate for the microphone 355 response. The Tx CODEC 343 may also comprise gain stages, a sigma-to-delta ADC, and a power amplifier, for example. A speech signal from the Tx CODEC 343 may be communicated to a high pass filter to remove DC, the DC remover 331. The output from the DC remover 331 may be utilized by the side tone filter/gain module 329 to generate a side tone. In this manner, the side tone frequency may be shaped or otherwise processed using side tone filtering and gain. The signal generated by the Tx CODEC 343 may contain acoustic coupled echo, local UL speech signal, and noise. The dual EC may then be utilized to reduce acoustic echo.

The difference between the DL signal R(n) and the UL signal S(n) in DL single talk mode may comprise the combined echo return loss and echo return loss enhancement (ERL+ERLE). This difference, ERL+ERLE, may comprise the total attenuation from the input of the RX CODEC 337 to the output of the dual EC 323, and may be measured for an extended period of time, since the echo delay time may not be known.

The dual EC 323 may comprise an adaptive EC 320 and an active EC 310. The adaptive EC 320 may be operable to determine divergence or convergence of an echo cancellation signal and may copy filter characteristics into the active echo canceller when it converges. Convergence may occur when the echo return loss enhancement (ERLE) for the adaptive EC 320 is higher than for the active EC 310 by a threshold amount for a period of time, such as 3 dB for 60 msec, for example. In this manner, when an echo path changes, such as when the wireless device moves from outside to inside an automobile, for example, the echo cancellation may adapt and cancel unwanted echoes.

Although downlink (DL) and uplink (UL) signals may overlap in the time domain during double talk, where both wireless device users in a conversation are speaking at the same time, it is not as likely that the signals overlap completely in the frequency domain. The dual EC 323 may be operable to utilize normalized block least mean squares (NBLMS) for updating the adaptive filtering, and linear prediction coefficient (LPC) filtering to generate appropriate signals for analysis. The dual EC 323 may utilize copy logic to copy the new adaptive filter coefficients into the active EC 310. The copy logic may be operable to monitor active ERLE for the active EC 310 and the adaptive EC 320 for a specified period of time, 60 msec for example, and if it exceeds a threshold level such as 3 dB, may then copy the adaptive filter coefficients. Similarly, since echo may only be significant when there is significant DL signal, the adaptive filter may only be updated when a significant DL signal is present.

Figure 4:
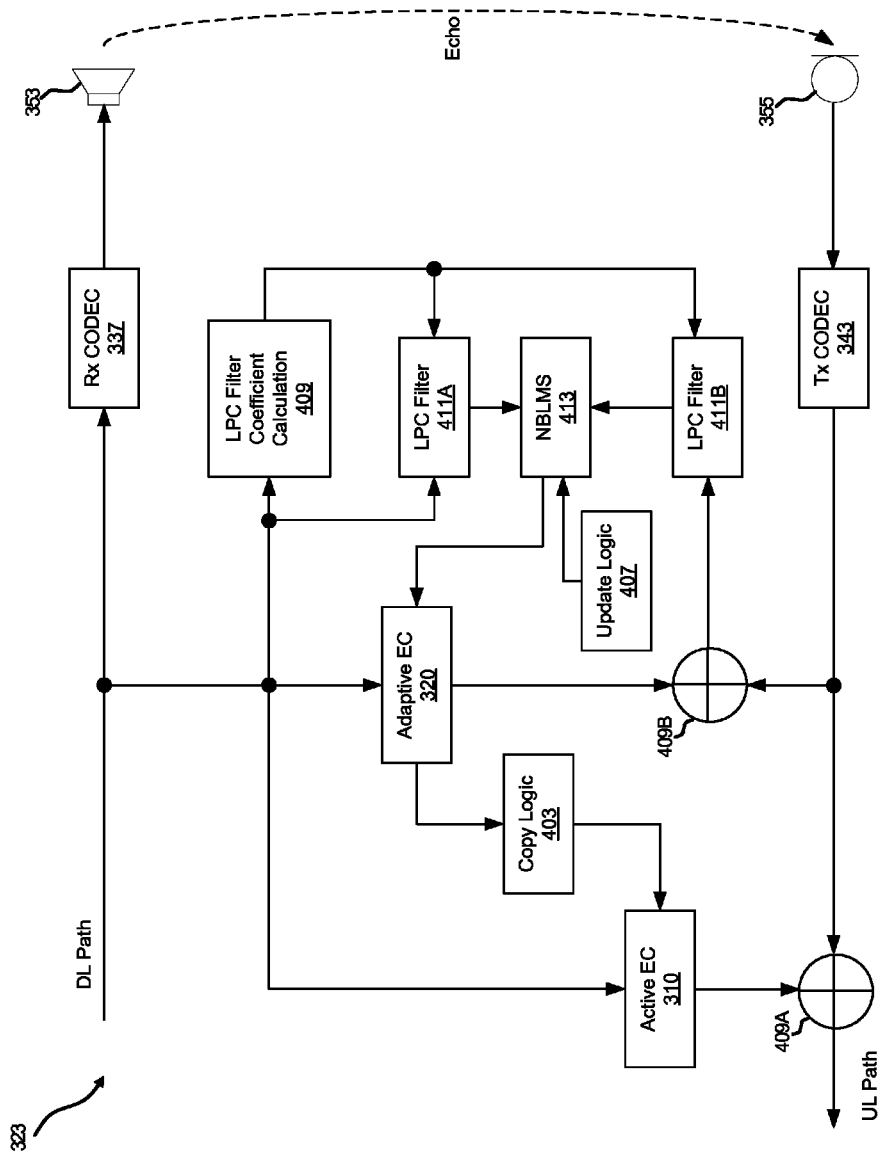
FIG. 4 is a diagram illustrating an exemplary dual echo canceller, in accordance with an embodiment of the invention.
Figure 5:
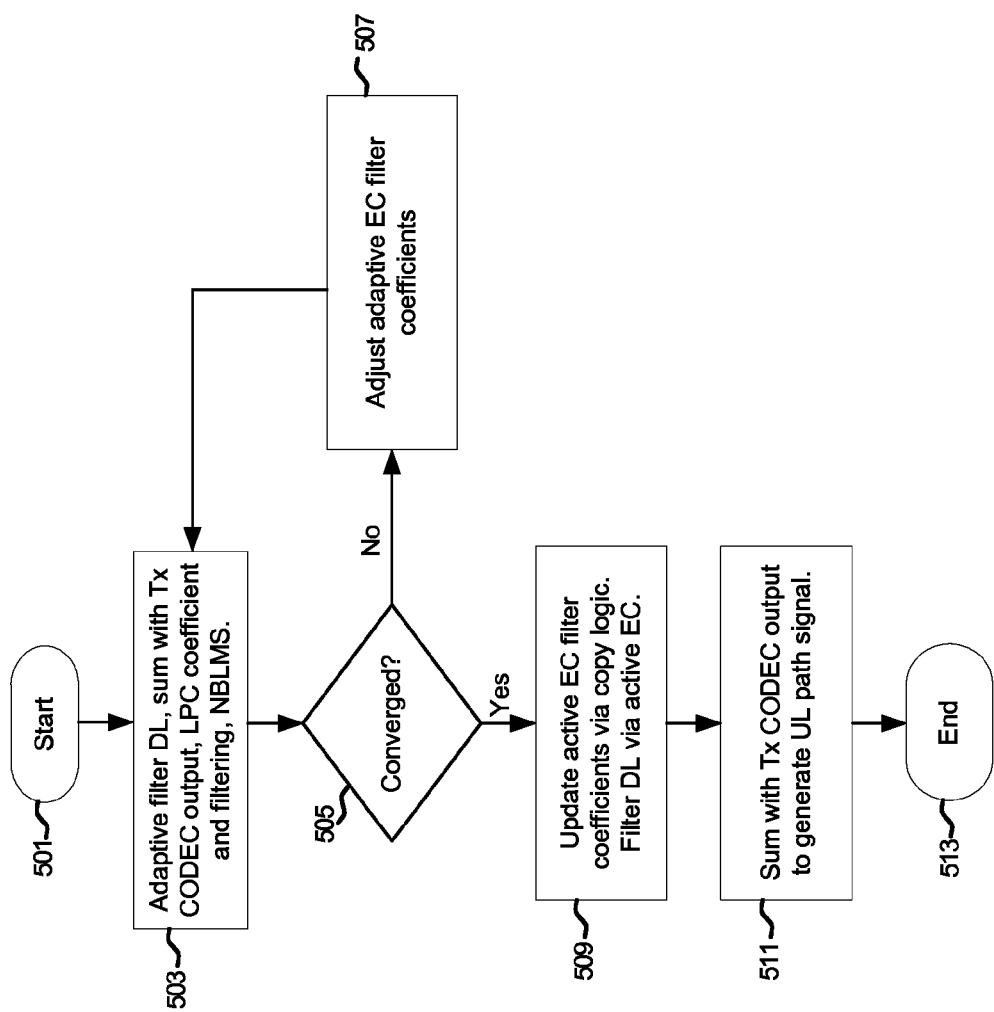
FIG. 5 is a diagram illustrating exemplary steps for echo cancellation utilizing a dual echo canceller, in accordance with an embodiment of the invention.

FIG. 4 is a diagram illustrating an exemplary dual echo canceller, in accordance with an embodiment of the invention. Referring to FIG. 5, there is shown a dual EC 323 comprising an active EC 310, copy logic 403, an adaptive EC 320, update logic 407, an LPC filter coefficient calculation module 409, LPC filters 411A and 411B, an NBLMS module 413, the speaker 353, and the microphone 355. The Rx CODEC 337, the Tx CODEC 343, the speaker 353, and the microphone 355 may be as described with respect to FIG. 3.

The active EC 310 may comprise suitable circuitry, logic, interfaces, and/or code that may be operable to actively cancel and/or filter echo signals. The filter coefficients of the active EC 310 may be received from adaptive EC 320 via the copy logic 403, and may be configured utilizing NBLMS due to the non-linear nature of speech. The filter coefficients of the active EC 310 may remain constant until updated by the adaptive EC 320 via the copy logic 403.

The copy logic 403 may comprise suitable circuitry, logic, interfaces, and/or code that may be operable to transfer filter characteristics from the adaptive EC 320 to the active EC 310 upon convergence of the adaptive EC 320. The copy logic 403 may comprise desired parameters which when achieved may initiate the transfer of the filter characteristics to the active EC 310. The desired parameters may comprise ERLE level over a period of time, and various protections such as divergence detection, echo path change detection, and reset, for example. The ERLE for a particular EC may be determined by comparing the input and output signals of that particular EC, such as the active EC 310 and the adaptive EC 320.

The adaptive EC 320 may comprise suitable circuitry, logic, interfaces, and/or code that may be operable to adaptively cancel and/or filter echo signals. The filter coefficients of the adaptive EC 320 may be configured utilizing NBLMS due to the non-linear nature of speech.

The update logic 407 may comprise suitable circuitry, logic, interfaces, and/or code that may be operable to indicate to the NBLMS module when to be calculating new adaptive EC 320 parameters. For example, in instances where there is little or no DL signal, the update logic 407 may indicate to the NBLMS module 413 not to calculate coefficients and save processing time and power consumption, since there would be little or no echo being generated by a DL signal in that instance.

The LPC filter coefficient calculation module 409 may comprise suitable circuitry, logic, interfaces, and/or code that may be operable to determine appropriate filter coefficients. Accordingly, the LPC filter coefficient calculation module 409 may receive as an input, the DL path signal and may generate filter coefficients utilizing linear prediction techniques. In this manner, since speech signals are typically colored, by LPC filtering, the signal becomes white.

The LPC filters 411A and 411B may comprise suitable circuitry, logic, interfaces, and/or code that may be operable to filter audio signals to convert them into white signals.

The NBLMS module 413 may comprise suitable circuitry, logic, interfaces, and/or code that may be operable to calculate filter coefficients for the adaptive EC 320 utilizing normalized block least mean squares techniques. Normalized block LMS may comprise the calculation of filter coefficients for blocks of data at a time where normalization may reduce convergence times. In this manner autocorrelation coefficients may be estimated in a DL signal sliding window.

In operation, the DL and the UL signals may be received by the dual EC 323. The DL signal may be communicated to the Rx CODEC 337 before being generated as sound at the speaker 353. The DL signal may also be communicated to the LPC filter coefficient calculation block 409 and the adaptive EC 320. In this manner, the colored DL audio signal may be broken into essentially white audio signal frequency ranges. The calculated LPC filter coefficients may be communicated to the LPC filters 411A and 411B to divide the DL signal into the plurality of frequency blocks. The filtered signal may then be analyzed by the NBLMS module 413, which may determine filter coefficients for the adaptive EC 320. The coefficients may be determined for a block of time and may be adapted after each of such blocks of time.

The output of the adaptive EC 320 may be summed with the UL signal generated by the Tx CODEC 343, the result then being filtered by the LPC filter 411B, before being communicated to the NBLMS module 413 for calculation of the adaptive EC 320 filter coefficients, thus forming a feedback loop. The NBLMS module 413 may be operable to calculate the filter coefficients when a significant UL signal may be present, as indicated by the update logic block 407.

The signal in the DL path may also be communicated to the active EC 310 for active echo filtering and/or cancellation. The filter coefficients for the active EC 310 may be updated whenever the adaptive EC 320 converges, such as when the adaptive EC 320 ERLE may be 3 dB higher than the active EC 310 ERLE for a period of time, such as 60 msec, for example. In this instance, the filter coefficients for the adaptive EC 320 may be communicated to the active EC 310 by the copy logic 403. The copy logic 403 may also comprise divergence protection, such as a negative ERLE, echo path change detection, such that when the copy logic 403 detects a large sudden change in ERLE, and may initiate a reset to default filter coefficient settings in the active EC 310. The filtered signal may then be added to the signal generated by the Tx CODEC 343 to generate the UL path signal.

FIG. 5 is a diagram illustrating exemplary steps for echo cancellation utilizing a dual echo canceller, in accordance with an embodiment of the invention. Referring to FIG. 5, in step 503, following start step 501, the DL path signal may be filtered by the adaptive EC 320 and also communicated to the active EC 310, the LPC filter coefficient calculation module 409, and the LPC filter 411A. The LPC filter coefficients may be calculated and communicated to the LPC filters 411A and 411B. The DL path signal may then be filtered by the LPC filter 411A. The filtered signal may be utilized by the NBLMS module to determine filter coefficients for the adaptive filter 320, which may filter and/or cancel the echo in the DL path signal before being summed with the output of the Tx CODEC 343.

The summed signal may be communicated to the LPC filter 411B, the output of which may also be used by the NBLMS module 413 to calculate the filter coefficients for the adaptive EC 320. In step 505, if the adaptive EC 320 has not converged, where the ERLE for the adaptive EC 320 is not better than the active EC 310 by a defined threshold for a period of time, the filter coefficients of the adaptive EC 320 may be updated by the NBLMS module 413 before the exemplary steps proceed back to step 503.

If, in step 505, the adaptive EC 320 has converged, the active EC 310 filter coefficients may be updated from the adaptive EC via the copy logic 403. The active EC 310 may then filter the DL path signal utilizing the new filter coefficients, and in step 511, the resulting signal may be summed with the Tx CODEC output to generate the UP path signal, followed by end step 513.

In an exemplary embodiment of the invention, a method and system is disclosed for a dual echo canceller 323 for use in, for example a wireless device 150. Echo may be cancelled utilizing a dual echo canceller, wherein the dual echo canceller 323 may comprise an active echo canceller 310 and an adaptive echo canceller 320. Filter coefficients may be copied from the adaptive echo canceller 320 to the active echo canceller 310 for the cancellation, based on whether the adaptive echo canceller 323 has converged. The filter coefficients may be copied utilizing copy logic 403, which may comprise divergence detection and/or echo path change detection. The filter coefficients for the adaptive echo canceller 320 may be reset to default settings utilizing the copy logic 403. The filter coefficients for the adaptive echo canceller 320 may be calculated utilizing normalized block least mean squares (NBLMS) 413. In one embodiment of the invention, the filter coefficients for the adaptive echo canceller 320 may be calculated when the NBLMS 413 is enabled by the update logic 407. The adaptive echo canceller 320 filter coefficients may be calculated utilizing linear predictive coefficient (LPC) filtered 411B and 411B uplink and downlink signals. The signals may comprise audio signals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a dual echo canceller.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic module, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals for wireless communication, the method comprising:
in a wireless device for communicating signals, performing functions comprising:
cancelling echo in said signals utilizing a dual echo canceller, wherein said dual echo canceller comprises an active echo canceller and an adaptive echo canceller, said cancelling including:
determining convergence of said adaptive echo canceller based on a presence of a significant downlink signal and an echo return loss enhancement (ERLE) for said adaptive echo canceller exceeding an ERLE for said active echo canceller by a predetermined threshold for a predetermined period of time; and
copying filter coefficients from said adaptive echo canceller to said active echo canceller for said cancellation, based on whether said adaptive echo canceller has converged.

2. The method according to claim 1, wherein copying said filter coefficients includes utilizing copy logic.

3. The method according to claim 2 wherein utilizing copy logic comprises utilizing divergence detection.

4. The method according to claim 2, wherein utilizing copy logic comprises utilizing echo path change detection.

5. The method according to claim 1, further comprising resetting said filter coefficients to default settings utilizing copy logic when the copy logic detects divergence.

6. The method according to claim 1, further comprising calculating said filter coefficients utilizing a normalized block least mean squares (NBLMS) approach.

7. The method according to claim 1, further comprising calculating said filter coefficients utilizing a normalized block least mean squares (NBLMS) approach only when a significant uplink signal is present.

8. The method according to claim 1, further comprising calculating said filter coefficients utilizing linear predictive coefficient (LPC) filtered uplink and downlink signals.

9. The method according to claim 1, wherein said signals comprise audio signals.

10. A system for processing audio signals, the system comprising:
one or more circuits configured for use in a wireless device that processes signals, wherein said one or more circuits comprise a dual echo canceller configured to cancel echo in said signals, wherein said dual echo canceller comprises an active echo canceller and an adaptive echo canceller, wherein:
said one or more circuits are further configured to determine convergence of said adaptive echo canceller based on a presence of a significant downlink signal and an echo return loss enhancement (ERLE) for said adaptive echo canceller exceeding an ERLE for said active echo canceller by a predetermined threshold for a predetermined period of time; and
said one or more circuits are further configured to copy filter coefficients from said adaptive echo canceller to said active echo canceller for said cancellation, based on whether said adaptive echo canceller has converged.

11. The system according to claim 10, wherein said one or more circuits are further configured to copy said filter coefficients utilizing copy logic.

12. The system according to claim 11, wherein said copy logic comprises divergence detection.

13. The system according to claim 11, wherein said copy logic comprises echo path change detection.

14. The system according to claim 10, wherein said one or more circuits are further configured to reset said filter coefficients to default settings when said one or more circuits detect divergence.

15. The system according to claim 10, wherein said one or more circuits are further configured to calculate said adaptive echo canceller filter coefficients utilizing a normalized block least mean squares (NBLMS) approach.

16. The system according to claim 10, wherein said one or more circuits are further configured to calculate said adaptive echo canceller filter coefficients only when a normalized block least mean squares (NBLMS) approach is enabled by a presence of a significant uplink signal.

17. The system according to claim 10, wherein said one or more circuits are further configured to calculate said adaptive echo canceller filter coefficients utilizing linear predictive coefficient (LPC) filtered uplink and downlink signals.

18. The system according to claim 10, wherein said signals comprise said audio signals.

19. The method according to claim 1, further comprising:
determining divergence based on at least one of negative ERLE, echo path change detection and a large sudden change in ERLE.

20. The system according to claim 10, wherein said one or more circuits are further configured to determine divergence based on at least one of negative ERLE, echo path change detection and a large sudden change in ERLE.

21. The method according to claim 1, wherein determining convergence of said adaptive echo canceller includes:
updating said adaptive echo canceller when said significant downlink signal is present; and
determining said convergence of said adaptive echo canceller based on said ERLE for said adaptive echo canceller exceeding said ERLE for said active echo canceller by said predetermined threshold for said predetermined period of time.

22. The method according to claim 1, wherein the significant downlink signal is a downlink signal that exceeds a threshold.

23. The method according to claim 1, further comprising:
providing an indication to an normalized block least mean squares (NBLMS) module to decline to calculate the filter coefficients.

24. The system according to claim 10, wherein said one or more circuits are further configured to:
update said adaptive echo canceller when the significant downlink signal is present; and
determine said convergence of said adaptive echo canceller based on said ERLE for said adaptive echo canceller exceeding said ERLE for said active echo canceller by said predetermined threshold for said predetermined period of time.

25. The system according to claim 10, wherein the significant downlink signal is a downlink signal that exceeds a threshold.

26. The system according to claim 10, wherein said one or more circuits are further configured to provide an indication to an normalized block least mean squares (NBLMS) module to decline to calculate the filter coefficients.

* * * * *